(12) United States Patent
Yamamoto et al.

(10) Patent No.: US 11,277,057 B2
(45) Date of Patent: Mar. 15, 2022

(54) SENSOR MAGNET OF MOTOR HAVING A FIXING PORTION TO PRESS-FIT TO A SHAFT WITHOUT A SENSOR MAGNET HOLDER

(71) Applicant: MABUCHI MOTOR CO., LTD., Matsudo (JP)

(72) Inventors: Kazuyuki Yamamoto, Chiba (JP); Satoshi Kikuchi, Chiba (JP)

(73) Assignee: MABUCHI MOTOR CO., LTD., Matsudo (JP)

( * ) Notice: Subject to any disclaimer, the term of this patent is extended or adjusted under 35 U.S.C. 154(b) by 786 days.

(21) Appl. No.: 16/038,727

(22) Filed: Jul. 18, 2018

(65) Prior Publication Data

US 2019/0044417 A1 Feb. 7, 2019

(30) Foreign Application Priority Data

Aug. 4, 2017 (JP) .............................. JP2017-151639

(51) Int. Cl.
| | |
|---|---|
| *H02K 11/215* | (2016.01) |
| *G01D 5/14* | (2006.01) |
| *G01D 5/244* | (2006.01) |
| *H02K 7/116* | (2006.01) |
| *H02K 11/21* | (2016.01) |
| *H02K 11/00* | (2016.01) |
| *H02K 11/24* | (2016.01) |

(52) U.S. Cl.
CPC ........... *H02K 11/215* (2016.01); *G01D 5/145* (2013.01); *G01D 5/244* (2013.01); *H02K 7/1166* (2013.01); *H02K 11/00* (2013.01); *H02K 11/21* (2016.01); *H02K 11/24* (2016.01)

(58) Field of Classification Search
CPC ...... G01D 5/145; G01D 5/244; H02K 7/1166; H02K 11/00; H02K 11/21; H02K 11/215; H02K 11/24
USPC ......... 310/12.25, 68 B, 89, 156.08, 216.053, 310/420, 421
See application file for complete search history.

(56) References Cited

U.S. PATENT DOCUMENTS

| | | | |
|---|---|---|---|
| 7,973,529 B2 | 7/2011 | Kikuchi et al. | |
| 9,360,295 B2 * | 6/2016 | Taniguchi | .............. G01D 11/30 |
| 2004/0164733 A1 * | 8/2004 | Fukaya | .................. G01D 5/145 |
| | | | 324/207.25 |
| 2006/0232148 A1 * | 10/2006 | Chen | ........................ H02K 7/09 |
| | | | 310/68 B |

(Continued)

FOREIGN PATENT DOCUMENTS

| | | |
|---|---|---|
| JP | 2001145320 A | 5/2001 |
| JP | 2010035411 A | 2/2010 |

*Primary Examiner* — Tulsidas C Patel
*Assistant Examiner* — Rashad H Johnson
(74) *Attorney, Agent, or Firm* — Myers Wolin, LLC.

(57) ABSTRACT

An annular sensor magnet to be fixed to a motor shaft by a press-fit includes an annular portion having magnetic poles alternately formed in an outer peripheral portion. The annular sensor magnet also includes a fixing portion extending from an inner peripheral portion of the annular portion toward a center to support and fix the motor shaft having been press-fit, and a stress reducing portion for reducing stress caused in a contact portion of the fixing portion that contacts the motor shaft when the motor shaft is press-fit onto the fixing portion. The sensor magnet includes a bonded magnet in which a magnetic material is dispersed in a plastic material.

9 Claims, 8 Drawing Sheets

(56) References Cited

U.S. PATENT DOCUMENTS

| | | | |
|---|---|---|---|
| 2006/0232149 A1* | 10/2006 | Horng | H02K 7/09 |
| | | | 310/68 B |
| 2006/0232150 A1* | 10/2006 | Horng | H02K 7/09 |
| | | | 310/68 B |
| 2009/0219017 A1* | 9/2009 | Mizuta | F16C 33/7883 |
| | | | 324/207.25 |
| 2010/0001719 A1* | 1/2010 | Kikuchi | H02K 23/66 |
| | | | 324/207.15 |
| 2014/0062226 A1* | 3/2014 | Cho | H02K 29/08 |
| | | | 310/43 |
| 2017/0346372 A1* | 11/2017 | Yamamoto | H02K 11/215 |
| 2017/0373548 A1* | 12/2017 | Arimatsu | H02K 1/27 |

* cited by examiner

50

50

SENSOR MAGNET OF MOTOR HAVING A FIXING PORTION TO PRESS-FIT TO A SHAFT WITHOUT A SENSOR MAGNET HOLDER

BACKGROUND

1. Technical Field

The present invention relates to a sensor magnet used in a motor.

2. Description of the Related Art

Some of conventional motors are equipped with a rotation detection device for detecting their rotational speed or rotation position. The rotation detection device typically includes an annular magnet called "sensor magnet", and a magnetism sensing element. The sensor magnet has magnetic poles that are alternately circumferentially formed and fixed to the motor shaft. The magnetism sensing element is disposed in the vicinity of the motor shaft. The sensor magnet is magnetized such that its magnetic flux changes in accordance with the rotation of the rotor. A change in the magnetic pole position of the sensor magnet accompanying the rotation of the motor shaft is detected by the magnetism sensing element. The change corresponds to a change in the rotation position of the rotor.

Accordingly, the sensor magnet needs to be fixed to the motor shaft. The sensor magnet may be fixed to the motor shaft by directly press-fitting the motor shaft into the center of the sensor magnet. This method, however, may result in cracking the sensor magnet. In another method for fixing the sensor magnet to the motor shaft, the sensor magnet is fixed to the motor shaft via a sensor magnet holder (see JP-A-2010-35411).

The sensor magnet holder for the method includes a cylindrical portion formed with a press-fitting portion for press-fitting the motor shaft, and a plurality of plate-like snap-fitting portions axially protruding from the cylindrical portion. The cylindrical portion and the snap-fitting portions are integrally formed. The sensor magnet is fixed to the magnet holder by means of the plurality of snap-fitting portions, which elastically deforms. Thus, when the motor shaft is press-fit into the sensor magnet holder, the resultant stress due to the motor shaft is not directly transmitted to the sensor magnet, preventing the cracking of the sensor magnet.

SUMMARY

However, the method by which the sensor magnet is fixed to the motor shaft via the sensor magnet holder requires the sensor magnet holder as a separate component, resulting in an increase in the number of components or assembly steps. In addition, the method, compared with the case in which a sensor magnet is press-fit onto the shaft directly, is more prone to causing an assembly error.

The present invention was made in view of the above circumstances. An object of the present invention is to provide a new technique for fixing a sensor magnet to a shaft.

In order to solve the problem, an embodiment of the present invention provides a sensor magnet which is an annular sensor magnet to be fixed to a motor shaft by a press-fit, the sensor magnet including: an annular portion having magnetic poles alternately formed in an outer peripheral portion thereof; a fixing portion extending from an inner peripheral portion of the annular portion toward the center thereof to support and fix the motor shaft having been press-fit; and a stress reducing portion for reducing a stress caused in a contact portion of the fixing portion that contacts the motor shaft when the motor shaft is press-fit onto the fixing portion. The sensor magnet includes a bonded magnet in which a magnetic material is dispersed in a plastic material.

According to this embodiment, when the motor shaft is press-fit into the center of the sensor magnet, the stress caused in the vicinity of the contact portion of the fixing portion can be reduced. Thus, the sensor magnet can be directly fixed to the motor shaft. In addition, it becomes possible to manufacture sensor magnets with various shapes. The stress reducing portion is only required to be configured to reduce a concentration of stress at a specific portion when the motor shaft is press-fit onto the sensor magnet, and is not necessarily required be disposed in the vicinity of the contact portion. The stress reducing portion may be provided by at least a part of the fixing portion or the annular portion.

The fixing portion may include a plurality of arms extending from the inner peripheral portion of the annular portion toward the center. This makes it possible to fix the sensor magnet to the motor shaft without much decrease in concentricity when the motor shaft is press-fit into the sensor magnet.

The arms may include a tip having disposed thereon the contact portion that contacts the motor shaft. This makes it possible for the fixing portion to support the motor shaft in a simple configuration.

The stress reducing portion may include an arc area between fixed ends of the plurality of arms. This makes it possible to reduce the stress concentration at the fixing portion from an area at a distance from the fixing portion.

The arc area may include a central portion having a radial thickness greater than a radial thickness of both end portions thereof. This makes it possible to distribute some of the stress at the central portion of the arc area to both end portions.

The arms may include a radial portion extending radially inward from the inner peripheral portion of the annular portion, and an axial portion axially extending from a center-side end portion of the radial portion. The axial portion may include an inner peripheral surface having disposed thereon the contact portion that contacts the motor shaft. This makes it possible for the arms to become easily bent.

The stress reducing portion may include the arms. This makes it possible to suppress the development of excessive stress concentration in an area other than the fixing portion.

When N1 is the number of the plurality of arms, and N2 is the number of the magnetic poles formed in the annular portion, N2=N1×n (n is a natural number) may be satisfied, N2 being an even number. This makes it possible to accurately set the magnetic characteristics due to the magnetic poles of the annular portion.

Another preferred embodiment of the present invention provides a motor. The motor includes a motor unit having a brush; a sensor magnet fixed to a motor shaft of the motor unit; a magnetic sensor arranged to oppose an annular portion of the sensor magnet; a worm fixed to the motor shaft; and a worm wheel meshed with the worm.

According to this embodiment, by detecting the rotation of the sensor magnet directly fixed to the motor shaft of the motor unit having a brush, using the magnetic sensor, it becomes possible to control the position of an object to be driven, such as a power window or a power seat, that is driven by means of a speed reducer including the worm and the worm wheel.

Various combinations of the above constituent elements or the expressions of the present invention may be converted between methods, devices, systems and the like in valid embodiments of the present invention.

According to the present invention, a sensor magnet can be fixed to a shaft.

and

Figure 9:
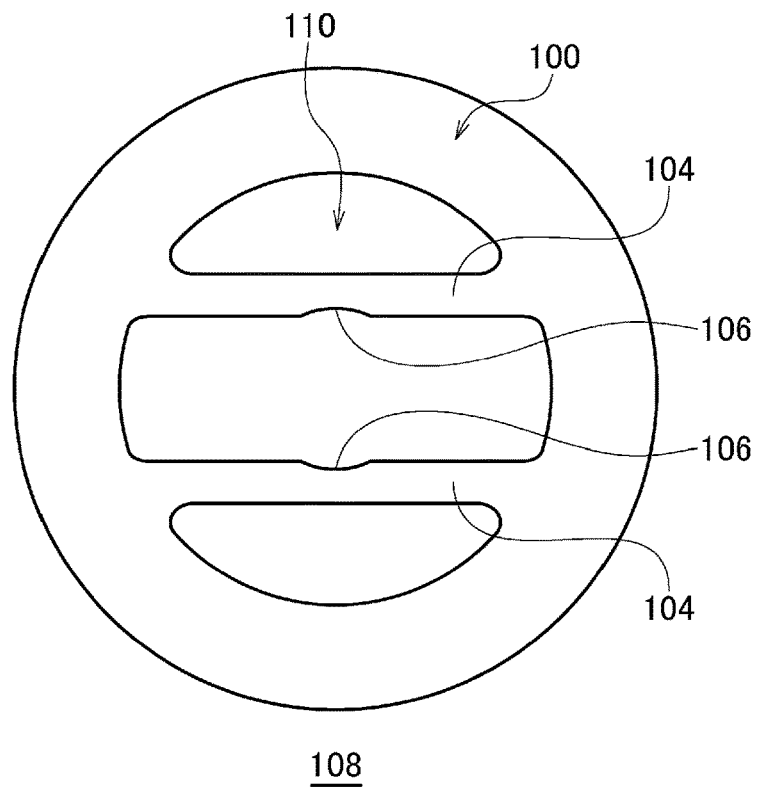

FIG. 9 is a front view of a sensor magnet according to a fourth modification.

DESCRIPTION OF THE EMBODIMENTS

In the following, embodiments of the present invention will be described with reference to the drawings. In the drawings, similar elements are designated with similar signs and redundant descriptions are omitted, as appropriate. The configurations described below are only exemplary and do not limit the scope of the present invention.

The technique of the present invention may be applied to various motors of which the rotational speed or rotation position needs to be detected, such as a brushed DC motor, a brushless motor, or a worm speed reducer-mounted motor in which such a motor is used. In the following, an example in which the technique is applied to a worm speed reducer-mounted motor will be described.

First Embodiment (Speed Reducer-Mounted Motor)

Figure 1:
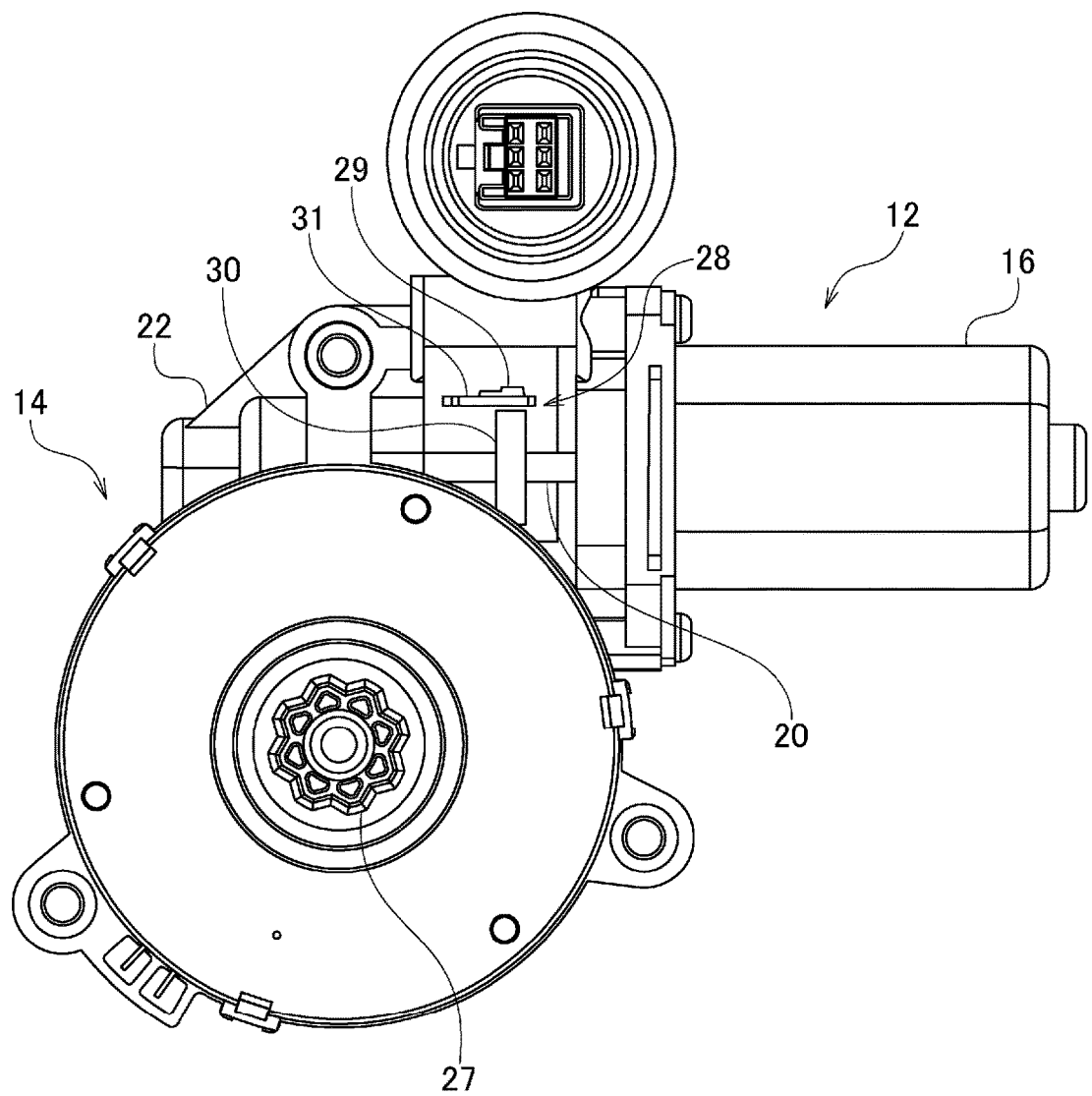
FIG. 1 is a front view of a worm speed reducer-mounted motor equipped with a sensor magnet according to the present embodiment.
Figure 2:
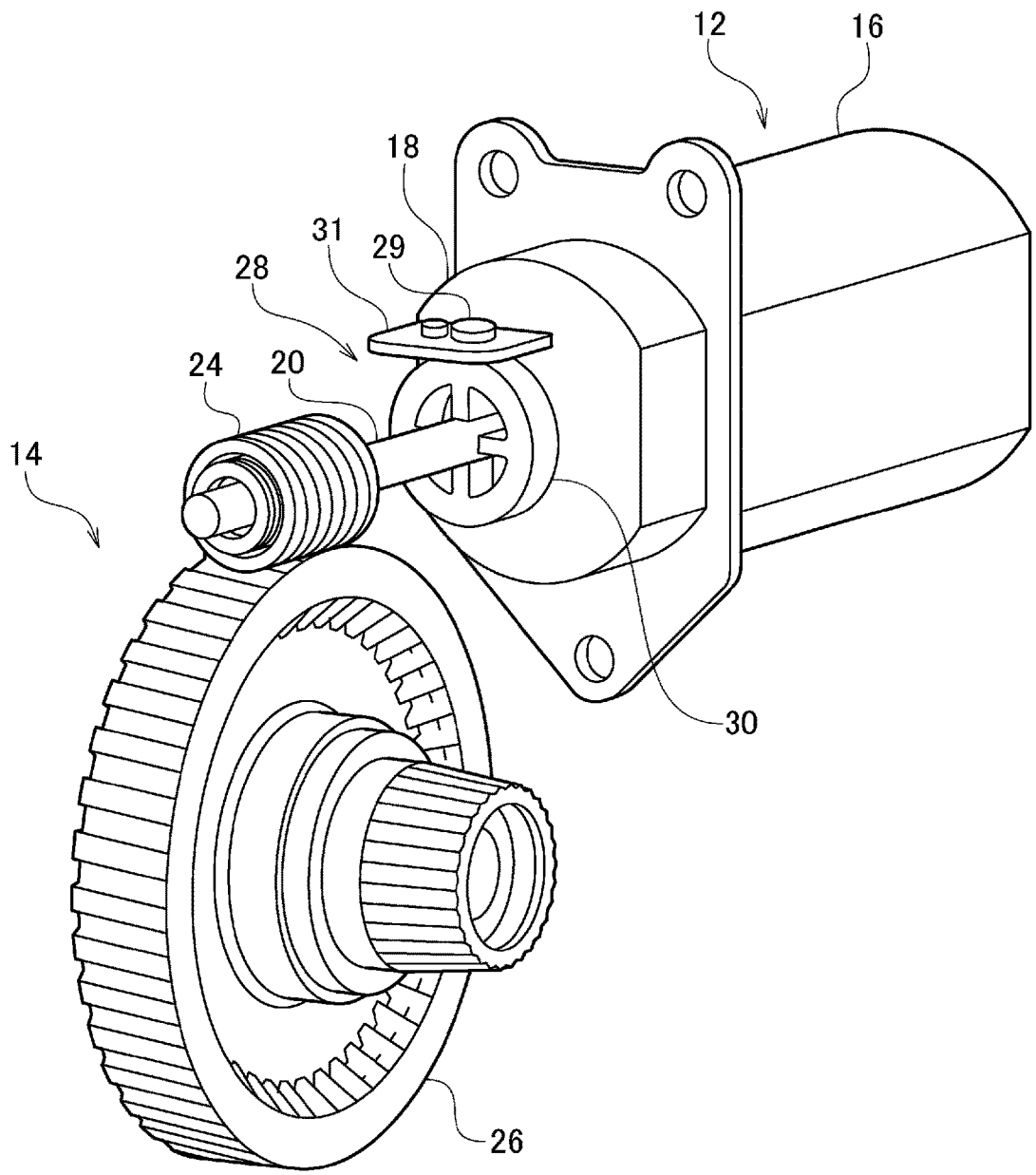
FIG. 2 is a cross sectional view of major portions of the worm speed reducer-mounted motor equipped with the sensor magnet according to the present embodiment.

FIG. 1 is a front view of a worm speed reducer-mounted motor equipped with a sensor magnet according to the present embodiment. FIG. 2 is a cross sectional view of major portions of the worm speed reducer-mounted motor equipped with the sensor magnet according to the present embodiment. In FIG. 1, a housing of a speed reducer unit is partially omitted so that the sensor magnet can be seen.

The speed reducer-mounted motor 10 mainly includes a motor unit 12 and a speed reducer unit 14. The speed reducer-mounted motor 10 is a conventional brushed DC motor. The motor unit 12 includes a motor case 16 and an end bell 18. The motor case 16 is formed of a metal material in the shape of a hollow tube having a bottom, and has magnets attached to an inner peripheral surface thereof. The end bell 18 is mounted to close the opening of the motor case 16. A motor shaft 20 extends out of the end bell 18 of the motor unit 12. The tip of the motor shaft 20 is journaled in a bearing provided in the speed reducer case 22.

The speed reducer unit 14 includes, for example, a worm 24 connected to the extending motor shaft 20, a worm wheel 26 meshed with the worm 24, and an output shaft 27 extending from the center of the worm wheel 26. The output shaft 27 is connected to a vehicle power window device, for example.

The rotation detection device 28 includes a combination of a magnetism sensing element 29 (such as a Hall element or a Giant Magneto Resistive (GMR) element) disposed on a fixed side and a sensor magnet 30 disposed on a rotating side. In the illustrated example, a substrate 31 is fixed to the speed reducer case 22, and a Hall element is attached on the substrate 31 so as to face the sensor magnet 30, which is rotated. The rotation detection device 28 is provided with wiring for supplying an electric current to the Hall element and extracting signals therefrom. The rotation detection device 28 detects a changing magnetic flux using the Hall element on the basis of a relative movement of the sensor magnet 30 and the Hall element due to motor rotation, and outputs pulse signals. Accordingly, the rotational speed and rotation position of the motor can be detected and controlled.

(Sensor Magnet)

Figure 3:
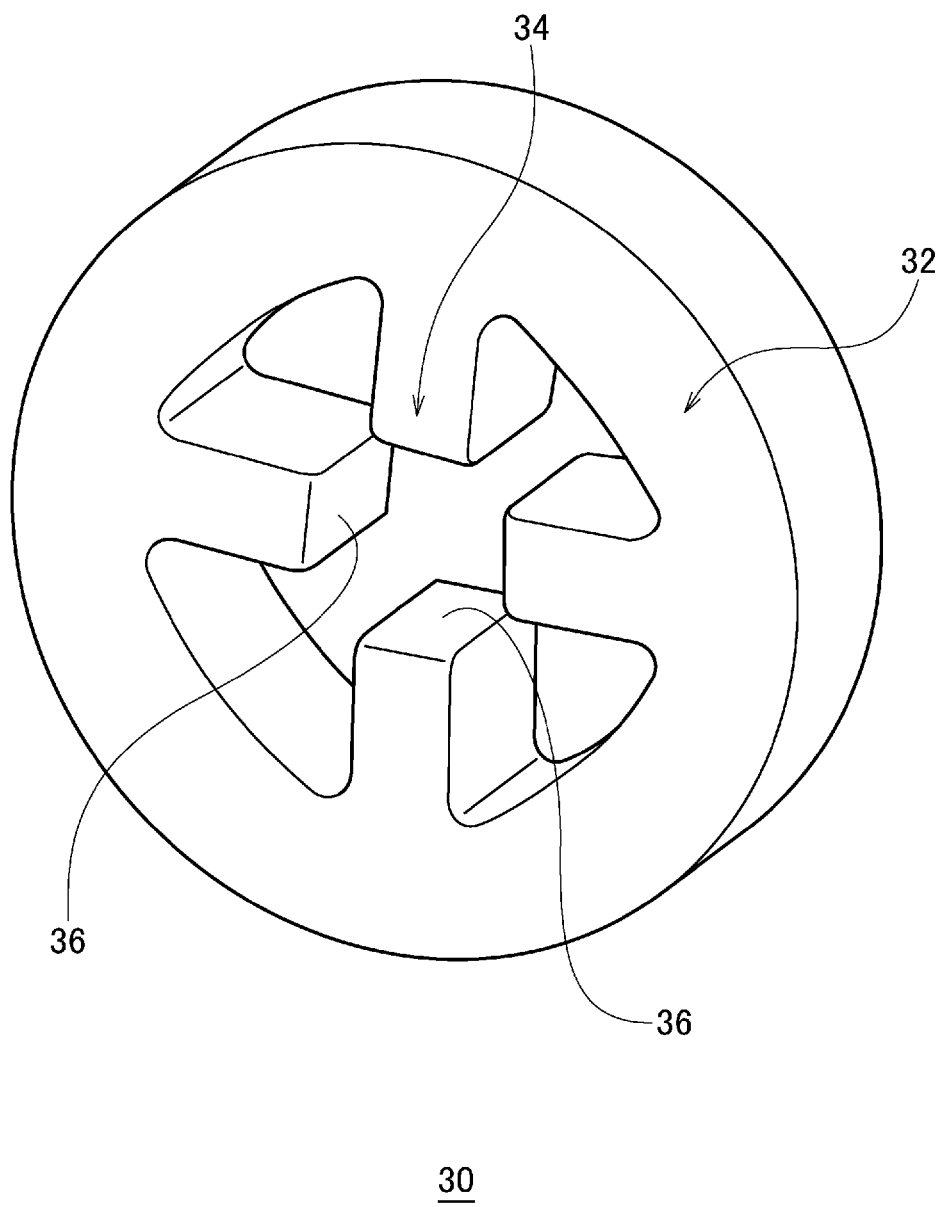
FIG. 3 is a perspective view of a sensor magnet according to a first embodiment.
Figure 4A:
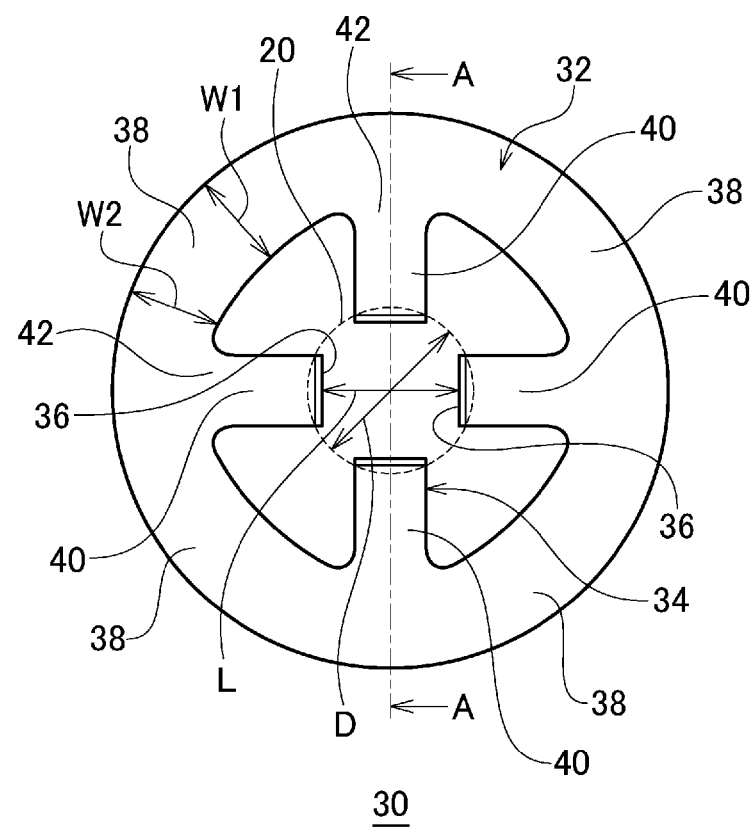
FIG. 4(a) is a front view of the sensor magnet according to the first embodiment.
Figure 4B:
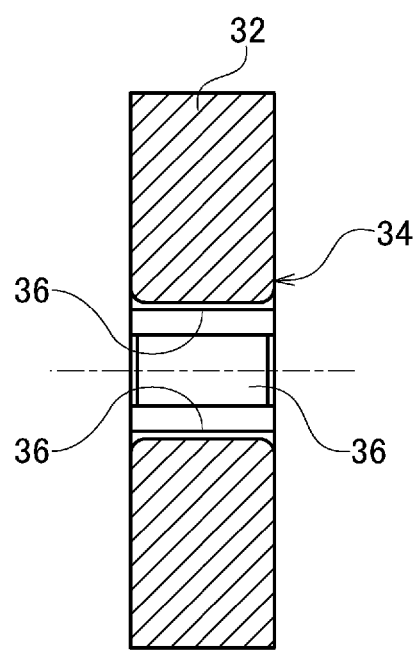
FIG. 4(b) is a cross sectional view of the sensor magnet taken along A-A of FIG. 4(a)

FIG. 3 is a perspective view of the sensor magnet according to the first embodiment 30. FIG. 4(a) is a front view of the sensor magnet according to the first embodiment 30. FIG. 4(b) is a cross sectional view of the sensor magnet 30 taken along A-A of FIG. 4(a).

The sensor magnet 30 is an annular magnet which is fixed by being directly press-fit onto the motor shaft 20. The sensor magnet 30 according to the present embodiment includes a bonded magnet in which a magnetic material is dispersed in a plastic material. Examples of the magnetic material include isotropic or anisotropic barium ferrite, strontium ferrite, SmCo, NdFeB, SmFeN, and AlNiCo.

The plastic material serves as a binder. When the sensor magnet is formed by injection molding, a preferable example of the plastic material is thermoplastic resin. An example of the thermoplastic resin is polyamide (polyamide 6, polyamide 12) resin. The mixture ratio (weight ratio) of the magnetic material and the plastic material may be selected depending on the performance of the magnetic material. For example, the mixture ratio is in a range of the order of 95:5 to 70:30. The sensor magnet 30 according to the present embodiment has a residual magnetic flux density Br on the order of 10 to 500 mT, and a coercivity bHc on the order of 40 to 250 kA/m.

By melting a mixture of the magnetic material dispersed in the plastic material and injecting the mixture into molds, sensor magnets of various shapes can be accurately and efficiently manufactured more easily.

The sensor magnet 30 is provided with: an annular portion 32 having magnetic poles alternately formed in an outer peripheral portion thereof; a fixing portion 34 which extends from an inner peripheral portion of the annular portion 32 toward the center, and which supports and fixes the motor shaft 20 that has been press-fit; and arc areas 38. The arc areas 38 serve as a stress reducing portion for reducing the stress caused in contact portions 36 of the fixing portion 34 that contact the motor shaft 20 when the motor shaft 20 is press-fit onto the fixing portion 34.

In the sensor magnet 30 according to the present embodiment, the stress caused in the vicinity of the contact portions 36 of the fixing portion 34 when the motor shaft 20 is press-fit into the center of the sensor magnet can be reduced. Accordingly, concentration of excessive stress in a part of the sensor magnet is made difficult to occur. Thus, the sensor magnet 30 can be directly fixed onto the motor shaft 20 without interposing another component between the motor shaft and the sensor magnet.

The stress reducing portion is only required to be configured to reduce the concentration of stress in a specific portion when the motor shaft 20 is press-fit into the sensor magnet 30. Thus, the stress reducing portion may not be disposed in the vicinity of the contact portions 36. In the present embodiment, the stress reducing portion includes the arc areas 38 which constitute a part of the annular portion 32 disposed at a distance from the fixing portion 34. The arc areas 38 are elastically deformed to reduce the rigidity of the sensor magnet 30 as a whole when the motor shaft 20 is press-fit into the sensor magnet 30, whereby the stress concentration in the vicinity of the contact portions 36 is reduced.

When the stress reducing portion is present in a part of the sensor magnet 30, compared with if the sensor magnet 30 was a rigid body in which the stress reducing portion was not present, it is possible, using Computer Aided Engineering (CAE) analysis, to decrease the maximum value of the stress caused when the motor shaft 20 is press-fit into the sensor magnet 30. As a result, it becomes possible to reduce the problem of partial cracking of the sensor magnet 30, or the need for a non-standard, excessive force during press-fitting.

As illustrated in FIG. 4($a$), the fixing portion 34 includes a plurality (four) of arms 40 extending from the inner peripheral portion of the annular portion 32 toward the center. The four arms 40 are disposed at 90-degree intervals radially about the portion onto which the motor shaft 20 is press-fit. Thus, the four arms 40 has a highly symmetric arrangement. This makes it possible to fix the sensor magnet 30 onto the motor shaft 20 without much decrease in concentricity when the motor shaft 20 is press-fit into the sensor magnet 30.

The arms 40 have a tip on which the contact portions 36 that contact the motor shaft 20 are disposed. Accordingly, the fixing portion 34 can support the motor shaft 20 in a simple configuration. In addition, the sensor magnet 30 has an upper-lower symmetric shape, which prevents the problem of mistaking the upper-lower relationship when the motor shaft 20 is assembled.

The arc areas 38 are provided between fixed ends 42 of the plurality of arms 40. This makes it possible to reduce the stress concentration at the fixing portion 34 from an area at a distance from the fixing portion 34. Thus, the degree of freedom in designing the shape of the sensor magnet is increased.

The arc areas 38 each include a central portion with a radial thickness W1 greater than a radial thickness W2 of both end portions thereof. This makes it possible to distribute some of the stress at the central portion of the arc areas 38 to both end portions. That is, the maximum value of the stress caused in the arc areas 38 when the motor shaft 20 is press-fit into the sensor magnet 30 can be decreased.

As illustrated in FIG. 4($a$), the sensor magnet 30 according to the present embodiment is set in a range such that $1.0>L/D\geq0.94$ and more preferably $0.99\geq L/D\geq0.97$, where L is the distance between the contact portions 36 of a pair of opposing arms 40, and D is the diameter of the motor shaft 20.

The sensor magnet also satisfies $N2=N1\times n$ (n is a natural number) where N1 is number of arms, and N2 is the number of magnetic poles formed in the annular portion, N2 being an even number. More specifically, in the sensor magnet 30, the number of the arms 40 may be four, and the number of the magnetic poles formed in the annular portion 32 may be four, eight, or 12, for example. In this case, it becomes easier to obtain a highly symmetric arrangement of the positions of the magnetic poles with respect to the arms. For example, when the number of the arms is four and the number of the magnetic poles is four, the positions of all of the magnetic poles can be aligned with respect to the adjacent arms. This makes it possible to accurately set the magnetic characteristics due to the magnetic poles of the annular portion 32. Meanwhile, if the number of the arms is three and the number of magnetic poles is four, the positions of all of the magnetic poles cannot be aligned with respect to the adjacent arms.

The speed reducer-mounted motor 10 according to the present embodiment is provided with: the motor unit 12 with brushes; the sensor magnet 30 fixed onto the motor shaft 20 of the motor unit 12; the magnetism sensing element 29 opposing the annular portion 32 of the sensor magnet 30; the worm 24 fixed to the motor shaft 20; and the worm wheel 26 meshed with the worm 24.

Accordingly, by detecting the rotation of the sensor magnet 30 directly fixed onto the motor shaft 20 of the motor unit 12 having brushes, using the magnetism sensing element 29, it becomes possible to control the position of an object to be driven, such as a power window or a power seat, which is driven by means of the speed reducer unit 14 including the worm 24 and the worm wheel 26.

Second Embodiment

Figure 5A:
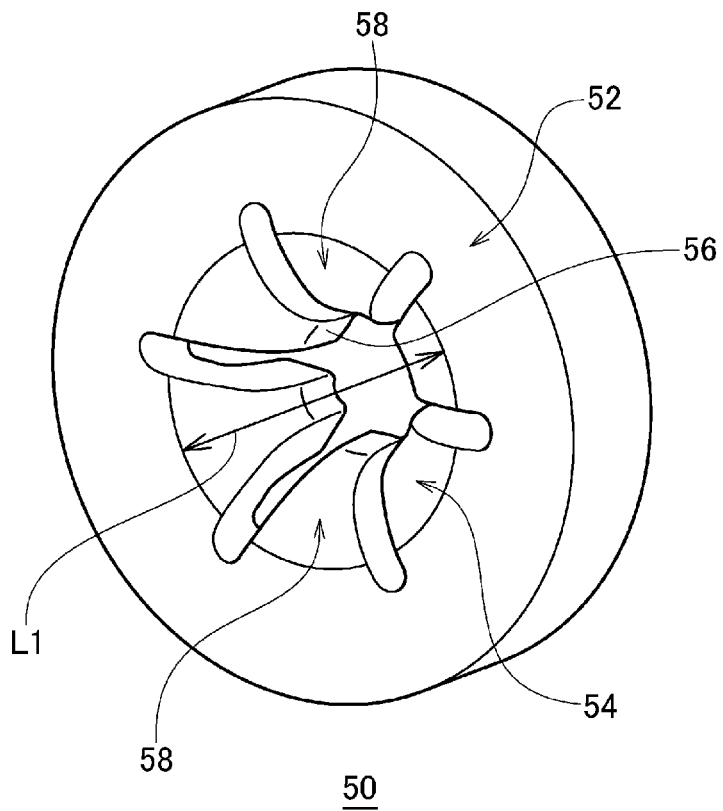
FIG. 5(a) is a perspective view of a sensor magnet according to a second embodiment.
Figure 5B:
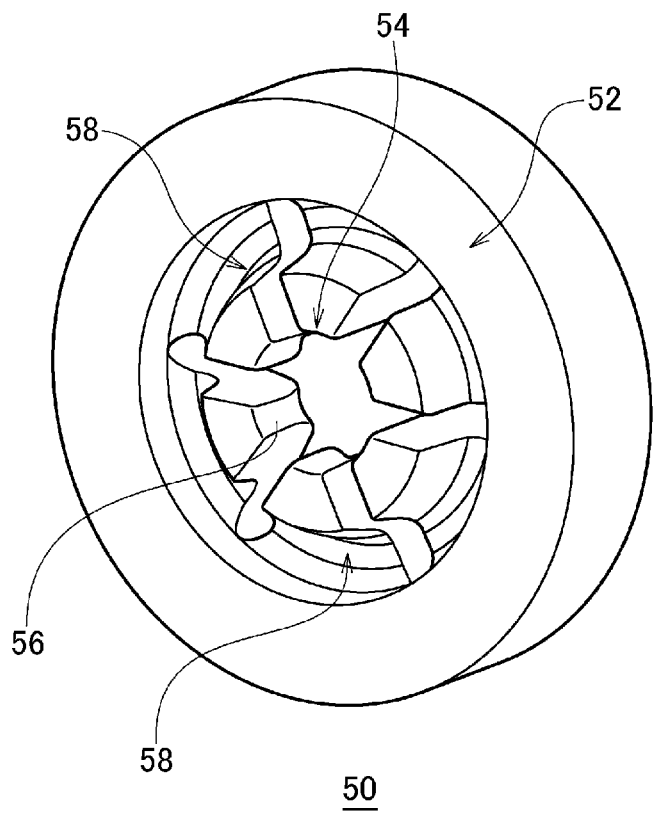
FIG. 5(b) is a perspective view of the sensor magnet according to the second embodiment as viewed from a direction different from FIG. 5A.
Figure 6A:
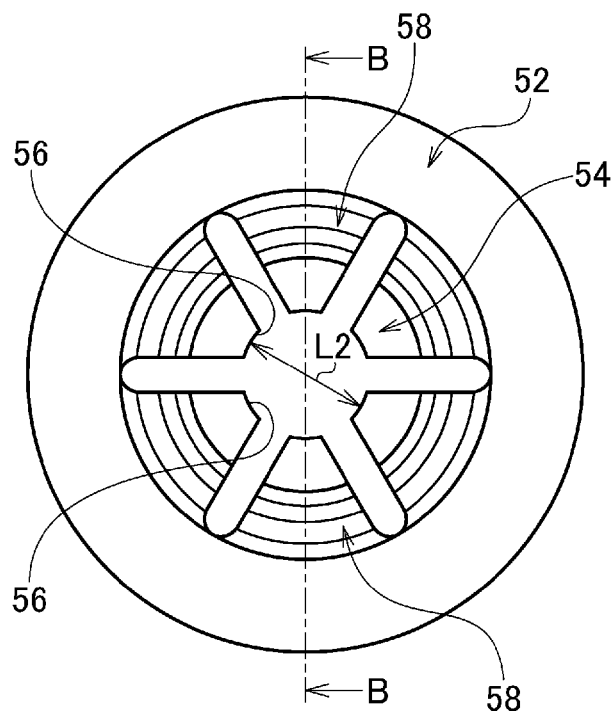
FIG. 6(a) is a front view of the sensor magnet according to the second embodiment.

FIG. 5($a$) is a perspective view of a sensor magnet according to a second embodiment. FIG. 5($b$) is a perspective view of the sensor magnet according to the second embodiment as viewed from a direction different from that of FIG. 5($a$). FIG. 6($a$) is a front view of the sensor magnet according to the second embodiment. FIG. 6($b$) is a cross sectional view of the sensor magnet taken along B-B of FIG. 6($a$). Descriptions of configurations similar to those of the sensor magnet according to the first embodiment 30 may be omitted, as appropriate.

The sensor magnet 50 is provided with: an annular portion 52 having magnetic poles alternately formed in an outer peripheral portion thereof; a fixing portion 54 which extends from the inner peripheral portion of the annular portion 52 toward the center, and which supports and fixes the motor shaft 20 that has been press-fit; and a stress reducing portion which reduces the stress caused in a contact portion 56 of the fixing portion 54 that contacts the motor shaft 20 when the motor shaft 20 is press-fit onto the fixing portion 54. In the present embodiment, the stress reducing portion is provided by at least a part of the fixing portion 54.

As illustrated in FIG. 5 and FIG. 6($a$), the fixing portion 54 includes a plurality (six) of arms 58 extending from the inner peripheral portion of the annular portion 52 toward the center. The arms 58, as illustrated in FIG. 6($b$), include: a radial portion 58$a$ extending radially inward from the inner peripheral portion of the annular portion 52; and an axial portion 58b axially extending from a center-side end portion of the radial portion 58a. The axial portion 58b has an inner peripheral surface on which the contact portion 56 that contacts the motor shaft 20 is provided. Thus, the arms 58 can be easily bent.

The six arms 58 are disposed at 60-degree intervals radially about the portion onto which the motor shaft 20 is press-fit. Thus, the six arms 58 have a highly symmetric arrangement. This makes it possible to fix the sensor magnet 50 onto the motor shaft 20 without much decrease in concentricity when the motor shaft 20 is press-fit into the sensor magnet 50.

Thus, in the sensor magnet according to the present embodiment 50, it is possible to reduce the stress caused in the vicinity of the contact portion 56 of the fixing portion 54 when the motor shaft 20 is press-fit at the center of the sensor magnet. Accordingly, concentration of excessive stress in a part of the sensor magnet is made difficult to occur. Thus, the sensor magnet 50 can be directly fixed onto the motor shaft 20 without interposing another component between the motor shaft and the sensor magnet.

In the present embodiment, the stress reducing portion is provided by a part of the arms 58. This makes it possible to suppress the development of excessive stress concentration in an area other than the fixing portion 54. When the motor shaft 20 is press-fit into the sensor magnet 50, the arms 58 are warped (elastically deformed), whereby the rigidity of the sensor magnet 50 as a whole is reduced and stress concentration in the vicinity of the contact portion 56 is reduced.

Also, when the stress reducing portion is present in a part of the sensor magnet 50, compared with if the sensor magnet 50 was a rigid body in which the stress reducing portion was not present, it is possible, using CAE analysis, to decrease the maximum value of the stress caused when the motor shaft 20 is press-fit into the sensor magnet 50. As a result, it becomes possible to reduce the problem of partial cracking of the sensor magnet 50, or the need for a non-standard, excessive force during press-fitting.

Figure 6B:
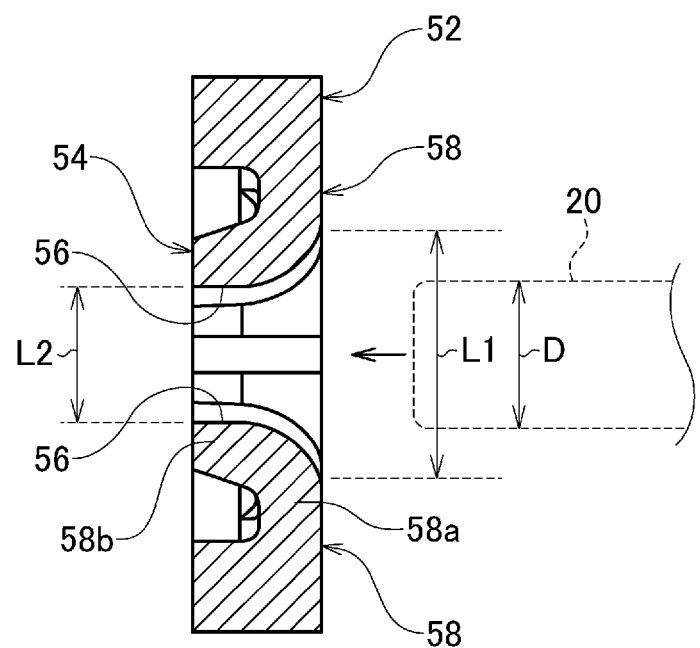
FIG. 6(b) is a cross sectional view of the sensor magnet taken along B-B of FIG. 6(a)

As illustrated in FIG. 6(b), the sensor magnet according to the present embodiment 50 is configured to satisfy L2<D<L1, where L1 is the diameter of the opening of an end face on the side on which the motor shaft 20 is inserted (the distance between the radial portions 58a of a pair of opposing arms 58), and L2 is the diameter of the opening of an end face on the opposite side from the side for inserting the motor shaft 20 (the distance between the contact portions 56 of a pair of arms 58).

Thus, in an initial period of insertion of the motor shaft 20 into the sensor magnet 50, the tip of the motor shaft 20 can be inserted along an R portion extending from the radial portion 58a to the axial portion 58b of the arms 58, without much resistance. Accordingly, it becomes easier to align the position of the motor shaft 20 with the center of the sensor magnet 50. Thereafter, the motor shaft 20 is inserted until the contact portion 56 is reached while the arms 58 are gradually warped, and the motor shaft 20 is press-fit into the sensor magnet 50.

In the sensor magnet 50, the number of the arms 58 may be six, and the number of the magnetic poles formed in the annular portion 52 may be six or 12, for example. In this case, it becomes easier to obtain a highly symmetric arrangement of the positions of the magnetic poles with respect to the arms. For example, when the number of the arms is six and the number of the magnetic poles is six, the positions of all of the magnetic poles can be aligned with respect to the adjacent arms. This makes it possible to accurately set the magnetic characteristics due to the magnetic poles of the annular portion 52. If the number of the arms is six and the number of the magnetic poles is four, the positions of all of the magnetic poles cannot be aligned with respect to the adjacent arms.

(Modifications)

Figure 7A:
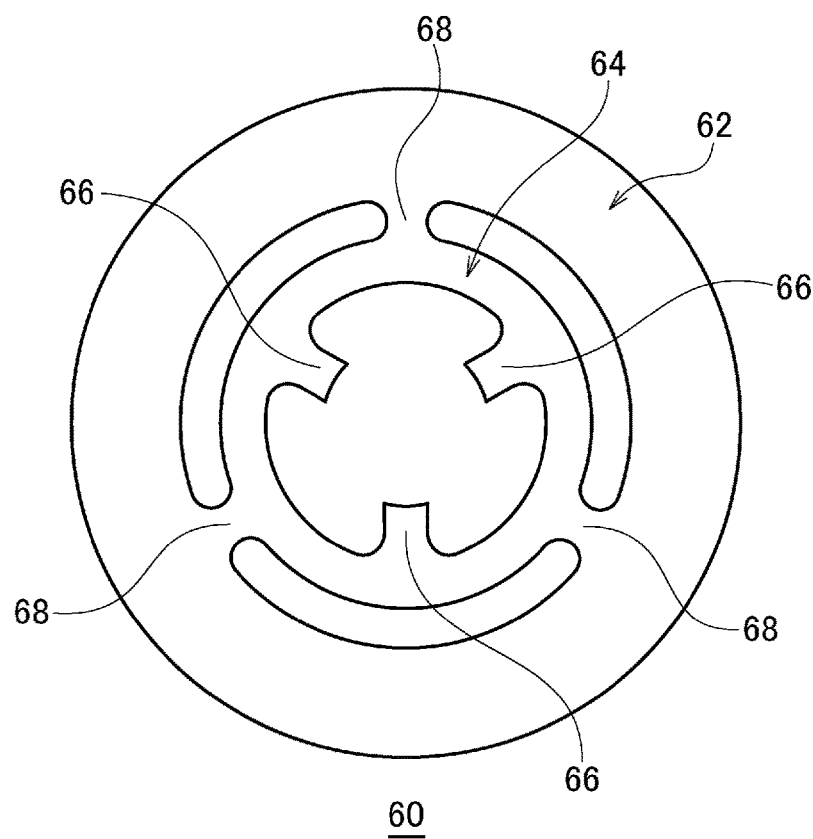
FIG. 7(a) is a front view of a sensor magnet according to a first modification.
Figure 7B:
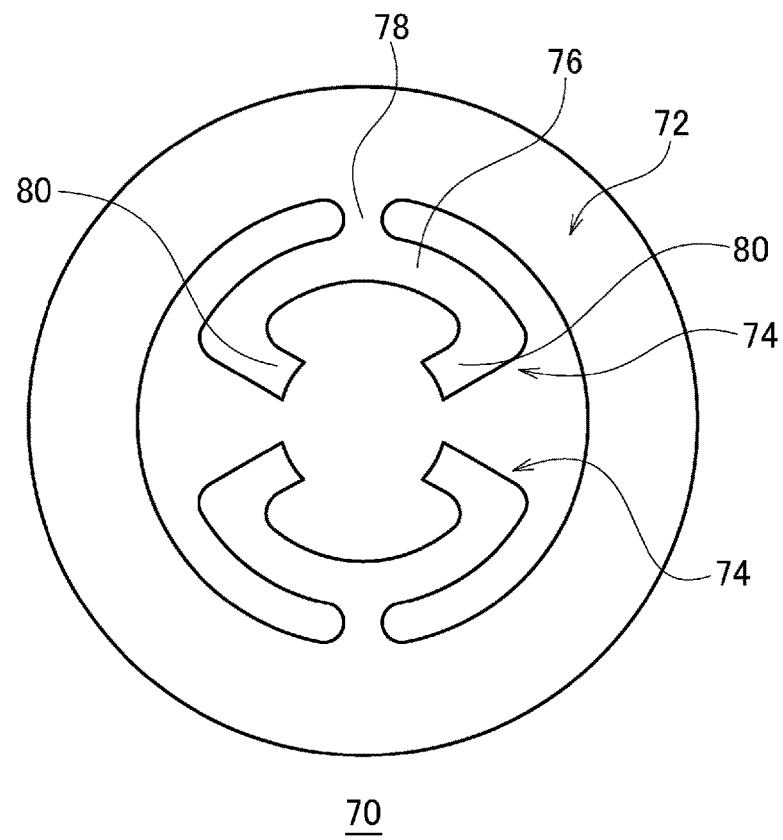
FIG. 7(b) is a front view of a sensor magnet according to a second modification.

In the following, modifications of the sensor magnet will be described, where the description will be focused on characterizing portions, and configurations similar to those of the foregoing embodiments may be omitted, as appropriate. FIG. 7(a) is a front view of a sensor magnet according to a first modification. FIG. 7(b) is a front view of a sensor magnet according to the second modification.

Referring to FIG. 7(a), the sensor magnet 60 includes: an outer annular portion 62; an annular portion 64 which is disposed on the inside of the annular portion 62 and has a smaller diameter than the annular portion 62; and three arms 66 extending from an inner peripheral portion of the annular portion 64 toward the center. The annular portion 62 and the annular portion 64 are linked by means of three link portions 68 formed at regular intervals.

The three arms 66 are disposed at 120-degree intervals radially about the portion onto which the motor shaft 20 is press-fit, and have a highly symmetric arrangement. Each of the arms 66 is formed between two link portions 68. That is, the three arms 66 and the three link portions 68 are arranged with their circumferential phases displaced from each other.

In the sensor magnet 60 thus configured, when the motor shaft 20 is press-fit at the center, the annular portion 64 on the fixed end side of the arms 66 are warped. That is, the annular portion 64 functions as a stress reducing portion.

Referring to FIG. 7(b), the sensor magnet 70 includes two fixing portions 74 opposing the inner peripheral side of the annular portion 72. The fixing portions 74 include: an arc portion 76; a link portion 78 linking the annular portion 72 and the arc portion 76; and a pair of arms 80 extending from both ends of the arc portion 76 toward the center.

In the sensor magnet 70 thus configured, when the motor shaft 20 is press-fit at the center, the arc portion 76 at the fixed end side of the arm 80 is warped. That is, the arc portion 76 functions as a stress reducing portion.

Figure 8:
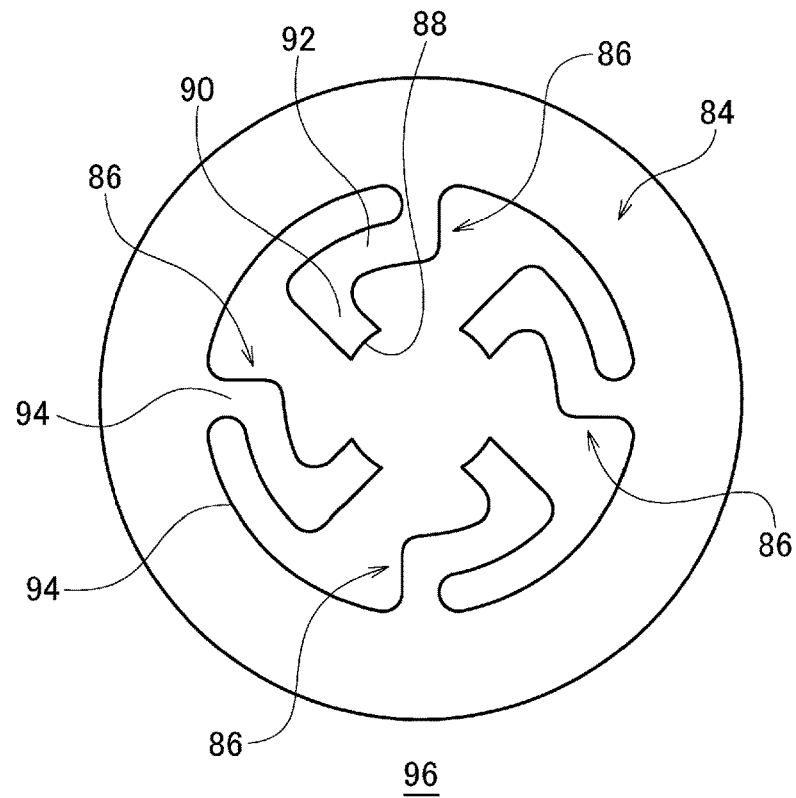
FIG. 8 is a front view of a sensor magnet according to a third modification.

FIG. 8 is a front view of a sensor magnet according to a third modification.

The sensor magnet 82 illustrated in FIG. 8 includes an annular portion 84 and four fixing portions 86 formed on the inner peripheral side thereof. The fixing portions 86 include: an arm 90 having a contact portion 88 formed at the tip thereof, the contact portion 88 for contacting the motor shaft 20 that has been press-fit; an arc portion 92 supporting the arm 90 at one end; and a link portion 94 linking the arc portion 92 and the annular portion 84. This makes it possible to increase the length of the arc portion 92 between the link portions 94 and the arm 90, thereby allowing a part of the fixing portions 86 to become easily bent.

FIG. 9 is a front view of a sensor magnet according to a fourth modification.

Referring to FIG. 9, the sensor magnet 108 includes an annular portion 100 internally linked with a fixing portion 110. The fixing portion 110 includes two straight line portions 104 formed so as to oppose each other across the center. At the center of the straight line portions 104, recesses 106 corresponding to the outer diameter of the motor shaft 20 are formed.

In the sensor magnet 108 thus configured, when the motor shaft 20 is press-fit at the center, the straight line portions 104 of the fixing portion 110 are warped. That is, the straight line portions 104 function as a stress reducing portion.

While the present invention has been described with reference to the embodiments and modifications, the present invention is not limited to the embodiments or modifications, and the present invention may include various combinations or substitutions of the configurations of the embodiments or the modifications, as appropriate. It will be understood that, based on the knowledge of those skilled in the art, the combinations in the embodiments or modifications or the sequence of processes therein may be changed, as appropriate, and that various modifications such as design changes may be made in the embodiments or modifications. Embodiments with such modifications may also be included in the scope of the present invention.

What is claimed is:

1. An annular sensor magnet to be fixed to a motor shaft by a press-fit, the annular sensor magnet comprising:
   an annular portion comprising magnetic poles alternately formed in an outer peripheral portion thereof;
   a fixing portion extending from an inner peripheral portion of the annular portion toward the center thereof to support and fix the motor shaft having been press-fit; and
   a stress reducing portion for reducing a stress caused in a contact portion of the fixing portion configured to contact the motor shaft when the motor shaft is press-fit onto the fixing portion,
   wherein the annular sensor magnet comprises a bonded magnet in which a magnetic material is dispersed in a plastic material,
   the fixing portion includes a plurality of arms extending from the inner peripheral portion of the annular portion toward the center;
   the stress reducing portion comprises an arc area between fixed ends of the plurality of arms; and
   the arc area includes a central portion with a radial thickness greater than a radial thickness of both end portions thereof.

2. A motor comprising:
   a motor unit comprising a brush;
   an annular sensor magnet according to claim 1 to be fixed to a motor shaft of the motor unit;
   a magnetic sensor arranged to oppose an annular portion of the annular sensor magnet;
   a worm the fixed to the motor shaft; and
   a worm wheel meshed with the worm.

3. The annular sensor magnet according to claim 1, wherein the arms include a tip comprising disposed thereon the contact portion configured to contact the motor shaft.

4. The annular sensor magnet according to claim 1, wherein $N2=N1 \times n$ (n is a natural number) is satisfied, where N1 is the number of the plurality of arms, and N2 is the number of the magnetic poles formed in the annular portion, N2 being an even number.

5. An annular sensor magnet to be fixed to a motor shaft by a press-fit, the annular sensor magnet comprising:
   an annular portion comprising magnetic poles alternately formed in an outer peripheral portion thereof;
   a fixing portion extending from an inner peripheral portion of the annular portion toward the center thereof to support and fix the motor shaft having been press-fit; and
   a stress reducing portion for reducing a stress caused in a contact portion of the fixing portion configured to contact the motor shaft when the motor shaft is press-fit onto the fixing portion,
   wherein the annular sensor magnet comprises a bonded magnet in which a magnetic material is dispersed in a plastic material;
   the fixing portion includes a plurality of arms extending from the inner peripheral portion of the annular portion toward the center;
   the arms include a radial portion extending radially inward from the inner peripheral portion of the annular portion, and an axial portion axially extending from a center-side end portion of the radial portion; and
   the axial portion includes an inner peripheral surface having disposed thereon the contact portion configured to contact the motor shaft.

6. The annular sensor magnet according to claim 5, wherein the arms include a tip comprising disposed thereon the contact portion configured to contact the motor shaft.

7. The annular sensor magnet according to claim 5, wherein the stress reducing portion comprises the arms.

8. The annular sensor magnet according to claim 5, wherein $N2=N1 \times n$ (n is a natural number) is satisfied, where N1 is the number of the plurality of arms, and N2 is the number of the magnetic poles formed in the annular portion, N2 being an even number.

9. A motor comprising:
   a motor unit comprising a brush;
   an annular sensor magnet according to claim 5 to be fixed to a motor shaft of the motor unit;
   a magnetic sensor arranged to oppose an annular portion of the annular sensor magnet;
   a worm the fixed to the motor shaft; and
   a worm wheel meshed with the worm.

* * * * *